US007199346B2

(12) United States Patent
Stam et al.

(10) Patent No.: US 7,199,346 B2
(45) Date of Patent: Apr. 3, 2007

(54) MOISTURE SENSOR AND WINDSHIELD FOG DETECTOR

(75) Inventors: Joseph S. Stam, Holland, MI (US); Jon H. Bechtel, Holland, MI (US); John K. Roberts, East Grand Rapids, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 11/231,234

(22) Filed: Sep. 20, 2005

(65) Prior Publication Data

US 2006/0065821 A1 Mar. 30, 2006

Related U.S. Application Data

(63) Continuation of application No. 10/999,175, filed on Nov. 29, 2004, now Pat. No. 6,946,639, which is a continuation of application No. 10/289,239, filed on Nov. 6, 2002, now abandoned, which is a continuation of application No. 09/878,799, filed on Jun. 12, 2001, now Pat. No. 6,495,815, which is a continuation of application No. 09/592,896, filed on Jun. 13, 2000, now Pat. No. 6,262,410, which is a continuation of application No. 09/347,093, filed on Jul. 2, 1999, now Pat. No. 6,097,024, which is a continuation of application No. 08/931,118, filed on Sep. 16, 1997, now Pat. No. 5,923,027.

(51) Int. Cl.
*G01N 15/06* (2006.01)
*H04N 5/335* (2006.01)

(52) U.S. Cl. .............................. 250/208.1; 250/227.25; 318/444

(58) Field of Classification Search ............. 250/208.1, 250/227.25, 574; 180/167; 15/DIG. 15; 318/44, 483, DIG. 2; 340/601, 602, 901
See application file for complete search history.

(56) References Cited

U.S. PATENT DOCUMENTS 4,355,271 A  10/1982  Noack (Continued)

FOREIGN PATENT DOCUMENTS

DE  29 46 561  5/1981

(Continued)

OTHER PUBLICATIONS

Sakugi Michihiko, "Abstract of Japan, Pub. No. 59-199347 "Wiper Controller for Vehicle"," (Nov. 12, 1984).

(Continued)

*Primary Examiner*—Stephone B. Allen
(74) *Attorney, Agent, or Firm*—Price, Heneveld, Cooper, DeWitt & Litton, LLP

(57) ABSTRACT

A control system is disclosed for automatically detecting moisture on the windshield of a vehicle. The automatic moisture detecting system includes an optical system for imaging a portion of the windshield onto an image array sensor, such as a CMOS active pixel sensor. The voltage of each of the pixels which represents the illumination level is converted to a corresponding gray scale value by an analog digital converter. The spatial frequency composition of the gray scale values are analyzed to determine the amount of rain present in order to provide a control signal to control the operation of the windshield wipers of the vehicle as a function of the amount of moisture present. The system is also adapted to detect the level of fog both on the interior of the windshield as well as the exterior of the windshield.

24 Claims, 5 Drawing Sheets

U.S. PATENT DOCUMENTS

| | | | |
|---|---|---|---|
| 4,481,450 A | 11/1984 | Watanabe et al. |
| 4,620,141 A | 10/1986 | McCumber et al. |
| 4,652,745 A | 3/1987 | Zanardelli |
| 4,798,956 A | 1/1989 | Hochstein |
| 4,859,867 A | 8/1989 | Larson et al. |
| 4,867,561 A | 9/1989 | Fujii et al. |
| 4,871,917 A | 10/1989 | O'Farrell et al. |
| 4,916,307 A | 4/1990 | Nishibe et al. |
| 4,916,374 A | 4/1990 | Schierbeek et al. |
| 4,930,742 A | 6/1990 | Schofield et al. |
| 4,956,591 A | 9/1990 | Schierbeek et al. |
| 4,960,996 A | 10/1990 | Hochstein |
| 4,973,844 A | 11/1990 | O'Farrell et al. |
| 4,987,354 A | 1/1991 | Steinmann |
| 5,059,877 A | 10/1991 | Teder |
| 5,276,389 A | 1/1994 | Levers |
| 5,306,992 A | 4/1994 | Droge |
| 5,313,072 A | 5/1994 | Vachss |
| 5,336,980 A | 8/1994 | Levers |
| 5,386,111 A | 1/1995 | Zimmerman |
| 5,483,346 A | 1/1996 | Butzer |
| 5,498,866 A | 3/1996 | Bendicks et al. |
| 5,581,240 A | 12/1996 | Egger |
| 5,598,146 A | 1/1997 | Schroder |
| 5,659,294 A | 8/1997 | Schroder |
| 5,661,303 A | 8/1997 | Teder |
| 5,663,542 A | 9/1997 | Kohr et al. |
| 5,666,037 A | 9/1997 | Reime |
| 5,703,568 A | 12/1997 | Hegyi |
| RE35,762 E | 4/1998 | Zimmerman |
| 5,796,094 A | 8/1998 | Schofield et al. |
| 5,796,106 A | 8/1998 | Noack |
| 5,811,793 A | 9/1998 | Pientka |
| 5,818,600 A | 10/1998 | Bendicks et al. |
| 5,821,863 A | 10/1998 | Schroder et al. |
| 5,872,437 A | 2/1999 | Pientka et al. |
| 5,877,897 A | 3/1999 | Schofield et al. |
| 5,923,027 A | 7/1999 | Stam et al. |
| 6,008,486 A | 12/1999 | Stam et al. |
| 6,097,024 A | 8/2000 | Stam et al. |
| 6,118,383 A | 9/2000 | Hegyi |
| 6,302,545 B1 | 10/2001 | Schofield et al. |
| 6,313,454 B1 | 11/2001 | Bos et al. |
| 6,320,176 B1 | 11/2001 | Schofield et al. |
| 6,326,613 B1 | 12/2001 | Heslin et al. |
| 6,353,392 B1 | 3/2002 | Schofield et al. |
| 6,376,824 B1 | 4/2002 | Michenfelder et al. |
| 6,396,397 B1 | 5/2002 | Bos et al. |
| 6,429,933 B1 | 8/2002 | Jackson, Jr. et al. |
| 6,946,639 B2 * | 9/2005 | Stam et al. ............... 250/208.1 |
| 2002/0047898 A1 | 4/2002 | Mindl et al. |
| 2002/0056805 A1 | 5/2002 | Bos et al. |
| 2002/0121972 A1 | 9/2002 | Schofield et al. |

FOREIGN PATENT DOCUMENTS

| | | |
|---|---|---|
| EP | 0 479 169 A | 4/1992 |
| GB | 2 056 059 | 3/1981 |
| JP | 59-199347 | 11/1984 |
| JP | 8-29325 | 2/1996 |
| JP | 9-126998 | 5/1997 |
| JP | 2001-28746 | 1/2001 |
| JP | 2001-206201 | 7/2001 |
| WO | WO 1994/19212 | 9/1994 |
| WO | WO 1994/27262 | 11/1994 |
| WO | WO 1997/35743 | 10/1997 |
| WO | WO 1999/23828 | 5/1999 |
| WO | WO 2001/77763 | 10/2001 |

OTHER PUBLICATIONS

Patent Abstracts of Japan, "Rainfall Detector and Automatic Wiper Device for Car," Publication No. 08-029325, p. 1 of 1, (Feb. 2, 1996).

Patent Abstracts of Japan, "External Monitoring Device Having Fail/Safe Function," Publication No. 2001-028746, p. 1 of 1, (Jan. 30, 2001).

Patent Abstracts of Japan, "Raindrop Detecting Device for Vehicle," Publication No. 2001-206201, p. 1 of 1, (Jul. 31, 2001).

* cited by examiner

MOISTURE SENSOR AND WINDSHIELD FOG DETECTOR

CROSS-REFERENCE TO RELATED APPLICATIONS

This application is a continuation of U.S. patent application Ser. No. 10/999,175 filed Nov. 29, 2004, now U.S. Pat. No. 6,946,639, which is a continuation of U.S. patent application Ser. No. 10/289,239 filed Nov. 6, 2002, now abandoned, which is a continuation of U.S. patent application Ser. No. 09/878,799 filed Jun. 12, 2001, now U.S. Pat. No. 6,495,815, which is a continuation of U.S. patent application Ser. No. 09/592,896 filed Jun. 13, 2000, now U.S. Pat. No. 6,262,410, which is a continuation of U.S. patent application Ser. No. 09/347,093, filed on Jul. 2, 1999, now U.S. Pat. No. 6,097,024, which is a continuation of U.S. patent application Ser. No. 08/931,118, filed on Sep. 16, 1997, now U.S. Pat. No. 5,923,027, the entire disclosures of which are incorporated herein by reference.

TECHNICAL FIELD

The present invention relates to a system for automatically detecting the presence of moisture on a surface such as the surface of a windshield of a vehicle, in order to automatically actuate the vehicle's windshield wipers and/or defroster or defogging system.

BACKGROUND ART

In conventional windshield wiper systems, the windshield wipers are actuated based upon the elapsed time between wipes rather than the moisture level on the exterior of the windshield. During conditions of relatively consistent rainfall, for example, the time interval can be adjusted to correspond to the amount of time in which the rain accumulates to the point of the desired visibility level. Unfortunately, the rate of rainfall may vary dramatically over a given period of time. Additionally, traffic conditions may also cause varying amounts of rain to fall on the windshield due to traffic conditions, such as a passing truck or the like. As a result, during such conditions, the wiper time interval must frequently be adjusted, which can be cumbersome.

Various systems are known which automatically control the interval between wipes of the windshield wipers based upon moisture on the vehicle windshield. In some known systems, various coatings are applied to the vehicle windshield. Electrical measurement of those coatings is used to provide an indication of the moisture content on the windshield. Unfortunately, such methods require relatively expensive processes which make such system commercially non-viable. Other systems for automatically sensing the moisture content on a vehicle windshield are also known. For example, optical systems are known which measure the difference of reflected light of a dry windshield versus a wet windshield. Unfortunately, the optical method is susceptible to interference from external light sources and thus provides inadequate performance. Other known systems must be adhered to the windshield which complicates the windshield replacement. As a result of such complications, moisture sensors are rarely found on vehicles.

Another system for automatically detecting the moisture content on a windshield is disclosed in Japanese Laid Open Patent Application No. Hei>(1995)-286130, which describes the use of a charge coupled device (CCD) image sensor to image a portion of the vehicle windshield in order to detect raindrops. The system described therein computes the sum of the differences between each pixel and the average of all pixels. Unfortunately, headlamps of oncoming vehicles will create a bright spot in the image which would be difficult to completely blur and likely be interpreted as rain. Moreover, in order for such a system to work effectively, images from the distant scene must be completely blurred. Otherwise, there will be dark and light regions in the distant scene. Although there is no optical system disclosed in the Japanese laid open patent application for accomplishing this objective, it would be very difficult to develop an optical system to completely blur an oncoming headlamp. Failure to blur oncoming headlamps could cause false triggering of the system disclosed in the above-identified Japanese laid open patent application.

Another problem with automatic rain detection systems is the inability of the system to detect the operation of the windshield wipers. In certain cold climate conditions, the windshield wipers are known to freeze to the windshield. In such a situation, since the moisture is not being removed by the wipers, an automatic rain sensing device would continuously command the wipers to actuate, even though the wipers are frozen to the windshield, potentially damaging the windshield wiper system.

Another known problem with known systems is the inability to detect fog on the interior and exterior of the windshields. As mentioned above, automatic moisture detection systems, such as disclosed in the above-identified Japanese laid open patent application, are based upon the ability to detect raindrops on the windshield. When a uniform fog or mist covers the vehicle windshield, systems, such as the system disclosed in the Japanese laid open patent application, are unable to sense such moisture on the exterior of the windshield. As a result, during such a condition, the windshield wipers will have to be manually actuated, thereby partially defeating the purpose of an automatic rain sensor and windshield wiper control system making the feature a lot less desirable.

In other situations, fog develops on the inside of the windshield independent of the moisture content on the exterior of the windshield. In such a condition, automatic rain sensing systems, such as disclosed in the Japanese laid open patent application, are unable to detect the moisture content on the exterior of the vehicle windshield until after the fog on the interior of the windshield is cleared. In such a condition, a defroster or defogger system would have to be manually actuated to remove the interior fog on the windshield. The automatic rain sensor would not be operable during such a condition until the fog on the interior of the windshield is sufficiently cleared.

The desirability of having automatic rain sensing is to have a system which automatically controls the windshield wipers during typical climatic conditions, such as rain, snow and fog. When the wiper system has to be operated manually during such typical conditions, such a feature becomes undesirable.

DISCLOSURE OF INVENTION

It is an object of the present invention to provide a system which solves the problems of the prior art.

It is yet another object of the present invention to provide a system for automatically detecting the moisture content on the windshield of a vehicle.

It is yet another object of the present invention to provide a system for automatically detecting moisture on the windshield of a vehicle during common climatic conditions, such as rain, snow and fog.

It is yet a further object of the present invention to provide a system for automatically detecting the presence of fog on the exterior of a windshield.

It is yet another object of the present invention to provide a system for automatically detecting the presence of fog on the interior of a windshield.

It is yet a further object of the present invention to provide a system for automatically sensing the windshield wipers crossing a portion of the windshield.

Briefly, the present invention relates to a system for automatically detecting moisture on the windshield of a vehicle. The automatic moisture detecting system includes an optical system for imaging a portion of the windshield onto an image array sensor, such as a CMOS active pixel sensor. The voltage of each of the pixels, which represents the illumination level, is converted to a corresponding gray scale value by an analog to digital converter. The gray scale values corresponding to the image are stored in memory. The spatial frequency composition of the gray scale values is analyzed to determine the amount of rain present in order to provide a control signal to control the operation of the windshield wipers of the vehicle as a function of the amount of moisture present. The system is also adapted to detect fog both on the interior of the windshield as well as the exterior of the windshield. By providing a system for automatically detecting the presence of fog on the interior and exterior of the windshield, serious performance limitations of known automatic rain sensors during typical climatic conditions are eliminated.

BEST MODE FOR CARRYING OUT THE INVENTION

Figure 1:
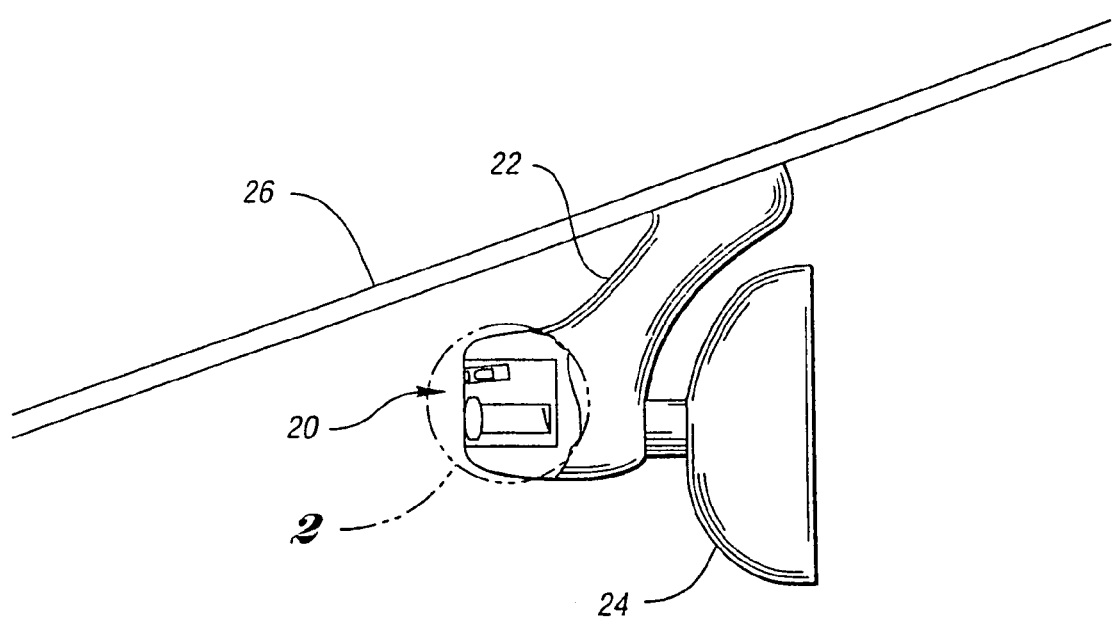
FIG. 1 is a physical diagram which illustrates a vehicle windshield and an attached rearview mirror illustrating a system in accordance with the present invention.

An automatic moisture sensing system in accordance with the present invention is able to detect moisture on the windshield of a vehicle in order to automatically control the vehicle's windshield wiper, defroster and/or defogging systems. The system for automatically sensing moisture on a vehicle windshield eliminates many of the performance deficiencies of known automatic moisture sensing systems at a commercially viable cost. As used herein, the term "moisture" is used to designate various types of moisture and precipitation which can be found on the windshield of a vehicle during various climatic conditions, such as rainfall, snowfall, ice, and fog, as well as other substances that are commonly deposited on a vehicle windshield such as bugs, dust and the like. The system is able to provide superior performance to other known systems during rather common climatic conditions, such as ice, fog and varying levels of rain and snowfall, and the like.

As will be discussed in more detail below, a portion of the windshield is imaged onto an image array sensor. An optical system which forms a portion of the present invention causes raindrops and other sources of moisture on the windshield to be sharply focused while distant objects beyond the windshield are severely blurred in the image. The processing system analyzes the image for sharp discontinuities caused by the edges of the water rain droplets or other moisture and by random focusing of the distant objects by the droplets. These discontinuities represent high spatial frequency components. The magnitude of high spatial frequency components is a measure of the amount of the rain or other moisture on the vehicle which can be used to automatically control the vehicle windshield wipers. In an alternate embodiment of the invention, the system is adapted to sense fog on the interior and exterior of the windshield in order to prevent spurious operation of the automatic moisture sensing system. As such, the present invention eliminates many of the various performance limitations of known automatic moisture sensing systems.

In yet another alternate embodiment of the present invention, the system is able to detect operation of the windshield wipers in order to prevent spurious operation and damage to the windshield wiper system during conditions when the windshield wipers are stuck or frozen to the windshield. As discussed above, the system analyzes the image of a portion of the windshield for sharp discontinuities which will have relatively high spatial frequency components. The magnitude of these high spatial frequency components is used to represent the measure of moisture or other substances on the windshield. Thus, dust, bugs and other substances will initially be treated as moisture. However, as discussed above, the system has the ability to automatically sense an operation of the windshield wiper blades. Thus, if the substance, which may be ice, dirt, cracks or other substances not removable by the windshield wipers remains on the windshield after one or more wipes, the system in accordance with the present invention may be configured to ignore such substances in order to prevent further spurious operation of the vehicle windshield wiper system.

Referring to FIG. 1, the automatic moisture sensing system in accordance with the present invention is generally identified with the reference numeral 20. The automatic moisture sensing system may be mounted stationary in the mounting bracket 22 of an automobile rearview mirror 24 or alternatively mounted in the rear portion of the rearview mirror housing 24. The automatic moisture sensing system 20 includes an image sensor mounted, for example, 2–3 inches behind the vehicle windshield 26 with the optical axis substantially parallel to ground or slightly angled to the ground. The angle of the windshield 26 in a modern passenger car is about 27°. Such a configuration may cause the raindrops and other moisture to be at a different distance from the image sensor depending on where the moisture is with respect to the field of view of the image sensor. To help compensate for this problem, the image sensor may be angled approximately 10° toward the windshield 26 such that the top of the sensor 20 is moved closer to the windshield 26.

Figure 2:
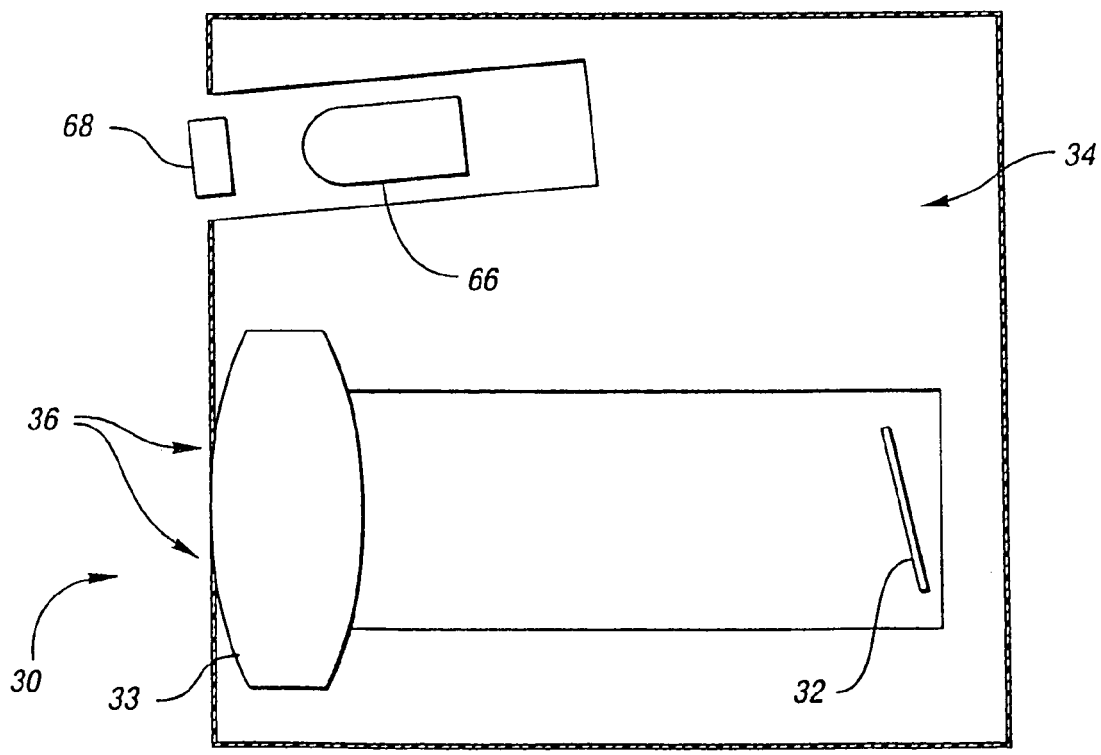
FIG. 2 is an enlarged view of a portion of the system for sensing moisture on the exterior of a windshield in accordance with the present invention.
Figure 5:
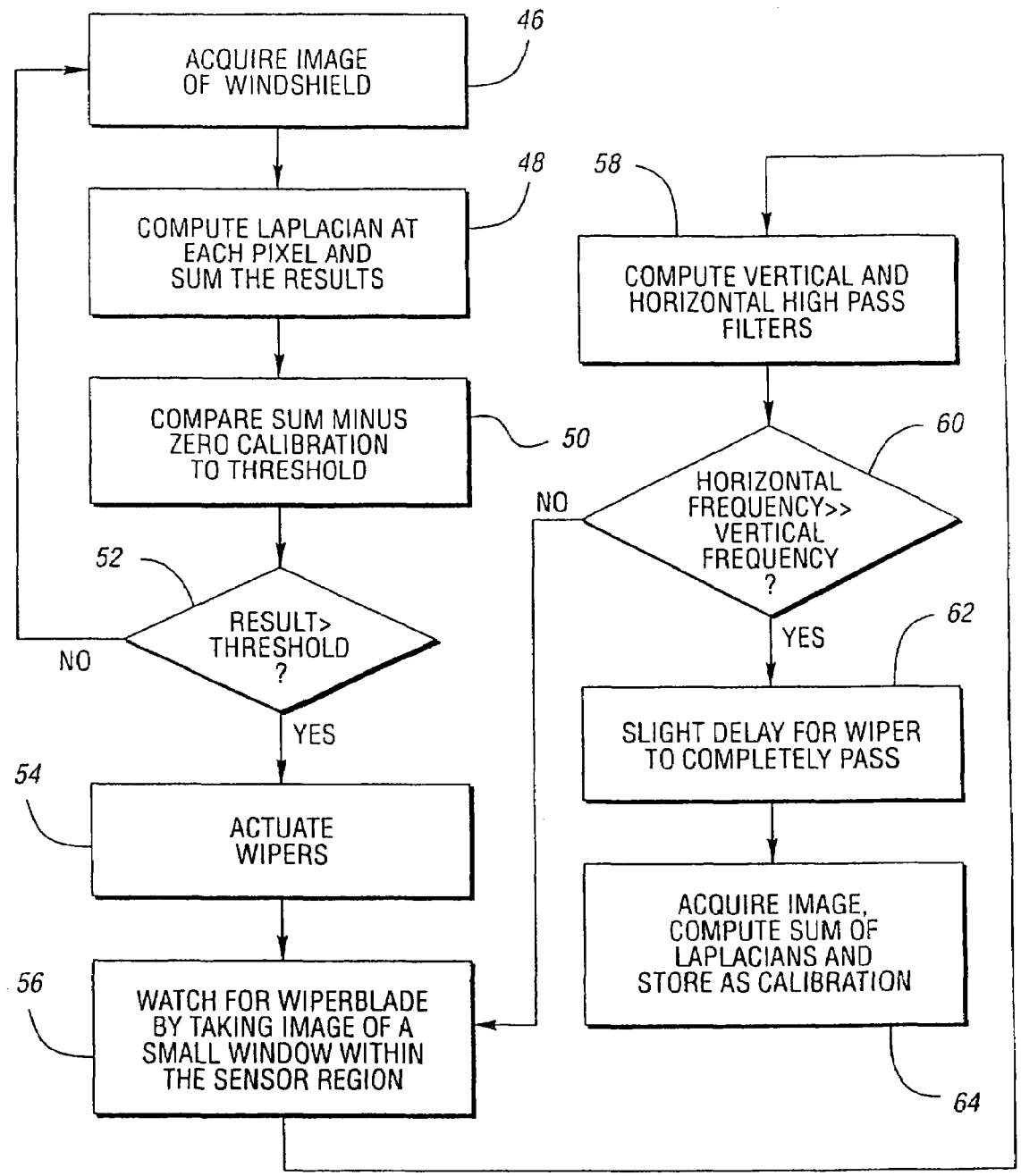
FIG. 5 is a flow diagram for the system in accordance with the present invention.

There are four main components to the automatic moisture sensing system 20: an imaging optical system; a light emitting diode; an image sensor; and a processor. The imaging optical system is shown best in FIG. 2 while the image sensor is illustrated in FIG. 2 and in FIG. 6. A flow diagram for the microcontroller is illustrated in FIG. 5.

Imaging Optical System

The imaging optical system, generally identified with the reference numeral 30 (FIG. 2), is used to image a predetermined portion of the windshield 26 onto an image sensor 32 such that objects at the approximate distance of the windshield 26 are sharply in focus at the image plane while objects at a longer distance are out of focus and blurred. The area of the windshield 26 that is imaged must be large enough that the probability of receiving raindrops during relatively light rain conditions is significant. Moreover, the imaged area of the windshield must also be in the area of the windshield that is wiped by the windshield wipers.

The imaging optical system may include a single biconvex lens 33 used as an imaging lens. The lens 33 may have a diameter of 6 mm, a front and rear radius of curvature of 7 mm for each surface, and a center thickness of 2.5 mm. The front surface of lens 33 may be positioned 62 mm from the outer surface of the windshield 26. The imaging lens 33 may be carried by a mechanical lens mount 34 which forms a stop 36 of about 5 mm diameter directly in front of the lens 33. The image sensor may be located about 8.55 mm from the rear surface of the lens 33 and as mentioned above, slightly angled by about 10°.

More elaborate optical systems, for example, with multiple elements, aspherical elements, or defractive objects could all be used, especially if shorter distance from the windshield is a desired feature. However, since the collected images are not for photographic purposes, such optical quality is not necessary in an application for automatic moisture detection. A single lens may also be used molded in acrylic or other clear plastics at a relatively low cost. Various companies including Polaroid and Kodak specialize in high performance molded plastic optics.

Figure 4A:
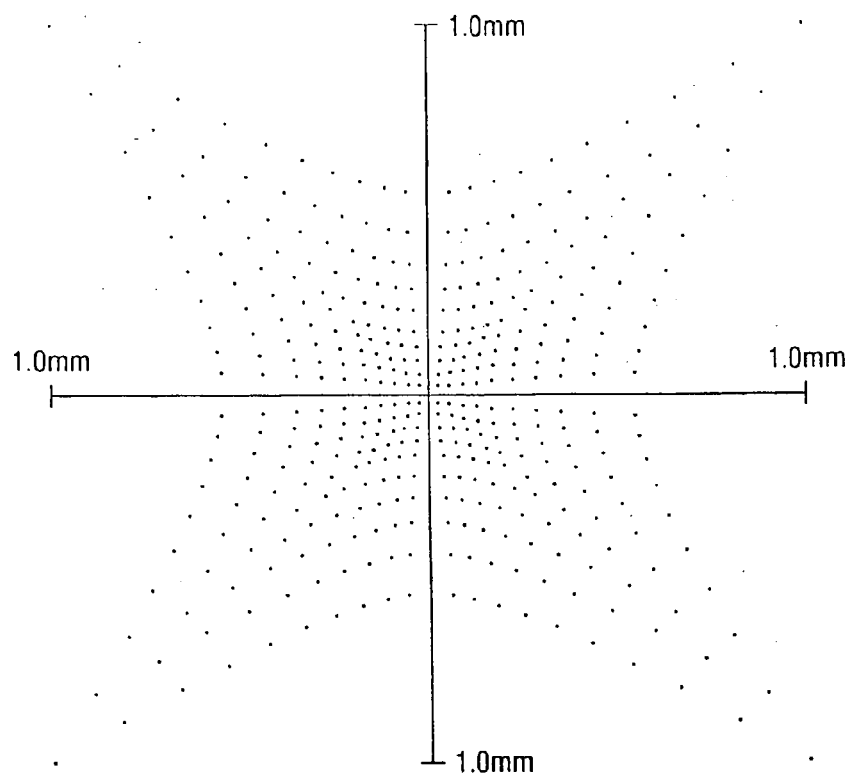
FIGS. 4a and 4b are computer-simulated spot diagrams which illustrate the performance of the optical system in accordance with the present invention during moisture and non-moisture conditions, respectively.
Figure 4B:
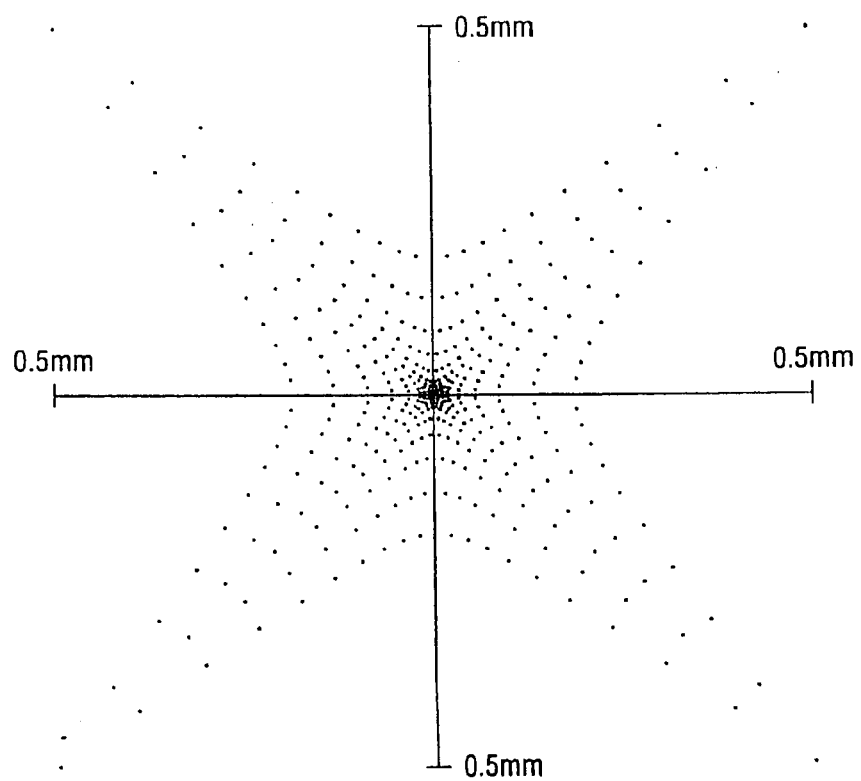

FIG. 4 illustrates a computer simulation of the performance of the imaging system illustrated in FIG. 2. In particular, FIG. 4a is a spot diagram of the imaging of approximately parallel light rays from a relatively distant object on the optical axis onto an image plane. FIG. 4b is a spot diagram of the imaging of a point on the optical axis at the distance of the outer surface of the windshield. Upon comparison of the spot diagrams of FIGS. 4a and 4b, it is evident that the optical system is able to blur light coming from distant objects while focusing light from objects at the windshield distance.

Occasionally, when driving up a hill, the vehicle could be positioned in such a way that the sun is directly imaged by the device. The radiative loading caused by this alignment may damage the image sensor 32 over time. In order to alleviate such a problem, an electrochromic filter may be used to temporarily eliminate most of the sunlight from the image plane. Other optical electronic or optical mechanical devices could also be used.

Image Sensor

The image sensor 32 may be a CMOS active pixel sensor. CMOS active pixel sensors are a recent breakthrough in imaging technology that allow low cost, high sensitivity imaging on a chip manufactured in a CMOS process. Such CMOS active pixel sensors have several advantages over other sensors including low power consumption, popular CMOS production techniques, low cost and ability to integrate additional circuitry on the same chip, variable read out windows and a variable light integration time. Such CMOS active pixel sensors are commercially available from Photobit LLC, La Crescenta, Calif. While CMOS active pixel sensors have substantial advantages, other image sensors are also suitable and are considered to be within the scope of the present invention. The size and number of pixels are determined to image an area of the windshield sufficiently large and in enough detail to adequately detect light rain while remaining cost effective. For example, a 64×64 active pixel, 40 μm pixel size array will image approximately a 25 mm×40 mm, on a standard passenger car windshield.

Processing and Control

Figure 6:
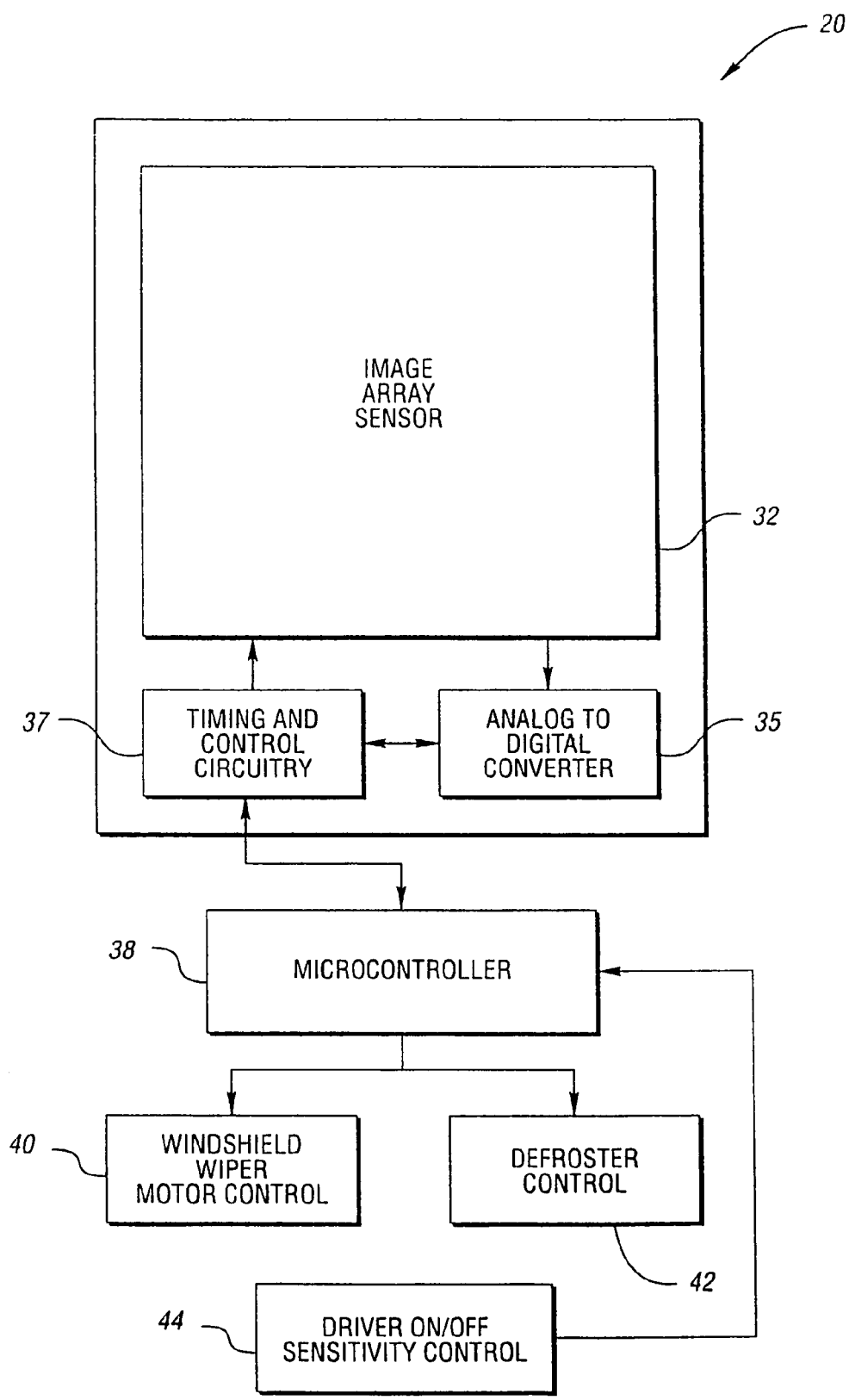
FIG. 6 is a block diagram of the system in accordance with the present invention.

A block diagram of the automatic moisture sensing circuitry is shown in FIG. 6. As mentioned above, a predetermined portion of the windshield 26 is imaged onto an image array sensor 32. The analog voltage of each of the pixels within the sensor 32 is converted to digitized gray scale value by way of an analog to digital converter. The analog to digital converter 35 is operated under the control of a timing and control circuit 37 which, in turn, is controlled by a microcontroller 38. The timing and control circuit 37 is described in detail in U.S. Pat. No. 5,990,469, entitled "CONTROL CIRCUIT FOR IMAGE ARRAY SENSORS," by Jon H. Bechtel et al., assigned to the same assignee as the assignee of the present invention, hereby incorporated by reference. A suitable microcontroller 38 is a Motorola type 68HC08XL36. However, it is commonly known that such microcontrollers do not contain sufficient random access memory (RAM) to store an entire image from a 50×50 pixel image sensor. In such a situation, a windowing feature of the CMOS imaging sensors may be used to alternatively image and process different regions of small enough size for the onboard RAM of the microcontroller 38.

As discussed above, the system analyzes the digitized gray scale values for sharp edges which are representative of raindrops or other moisture by analyzing the spatial high frequency components. The magnitude of the spatial high frequency components is used to control a windshield wiper motor control 40 such that the frequency of wiping of the windshield wiper blades (i.e., time interval between wipes) is controlled as a function of the amount of moisture on the windshield. As will be discussed in more detail below, the system is also able to detect the fog on the interior and exterior of the windshield. Thus, the microcontroller 38 may also be used to automatically control the vehicle defroster or defogging system 42. In order to provide selectivity of a system, a driver on/off sensitivity control circuit 44 may be provided. This control circuit 44 may be used in special circumstances, for example, when the vehicle is in an automatic car wash to prevent spurious operation of the system.

Once an image is acquired by the image array sensor 32, the luminance on each pixel, represented by an analog voltage, is converted to a digital gray scale value by the analog digital converter 35. These values are written to memory, which may be on board the microcontroller 38 and processed by the microcontroller 38 or alternatively a digital signal processor.

Rain is detected by quantifying the discontinuity resulting from sharp edges of the raindrops on the windshield. These sharp edges are caused by the focused image of the rain or other moisture droplet along with the random optical imaging of far field objects by the droplets or other moisture. As discussed in "Digital Image Processing" by R. C. Gonolez and R. E. Woods, Addison-Wesely 1992, hereby incorporated by reference, the images may be analyzed in terms of their spatial frequency composition. Spatial frequency composition analysis is analogous to Fourier analysis, commonly used in both digital and analog signal processing. The process of taking a Fourier transform of a signal and determining its frequency composition can readily be applied to two-dimensional signals. When the two-dimensional signal is an image, it is common to use the term "spatial frequency." The spatial frequency composition of an image can be evaluated using a two-dimensional Fourier transform of the image. The transform is given by equation (1) as follows:

$$F(\omega_y, \omega_y) = \int_{-\infty}^{\infty} \int_{-\infty}^{\infty} f(x, y) e^{-j\omega_x x} e^{-j\omega_y y} dx dy \quad (1)$$

where: f (x,y) is the value of the pixel in the original image located at pixel x,y; F ($\omega_x$, $\omega_y$) is the value of the Fourier transform of the image at pixel location ($\omega_x$, $\omega_y$); and j is the complex number $\sqrt{-1}$.

Equation (1) describes the Fourier transform for continuous infinite two-dimensional signals. This function can be readily adapted to discrete, finite two-dimensional signals resulting from digital images. Applying spatial frequency analysis techniques, the rough edges or "roughness" of an image can be relatively accurately quantified. For example, a Fourier transform can be performed on a very blurry image. In such an analysis, the value of F ($\omega_x$, $\omega_y$) for low magnitudes $\omega$ of spatial frequencies $\omega_x$, $\omega_y$ will be high while the value of F ($\omega_x$, $\omega_y$) at high magnitudes of $\omega_x$, $\omega_y$ will be low. The value of F ($\omega_x$, $\omega_y$) where $\omega_x$, $\omega_y$ are both 0 is always the average gray scale value of the image.

Alternatively, a Fourier analysis of a sharply focused image with many edges will result in the values of F ($\omega_x$, $\omega_y$) for large magnitudes of $\omega_x$, $\omega_y$ being high. A digital filter can be used to select particular spatial frequency regions. A relatively simple implementation of such a filter for image processing uses a 3×3 matrix supplied to a 3×3 pixel neighborhood as illustrated below:

| A | B | C |
| D | E | F |
| G | H | I |

A new image g(x,y) can be formed which is the resultant image of applying the filter to the current image. The image may be processed in a looping fashion for every pixel with a value of f(x,y) at a location defined by the variables x and y. In the above matrix, the location of the coefficient E corresponds to the current pixel at x and y. The pixel at location x and y in the new image has a value given by equation (2) below:

$$g(x,y)=A \cdot f(x-1,y-1)+B \cdot f(x,y-1)+C \cdot f(x+1,y-1)+ \\ D \cdot f(x-1,y)+E \cdot f(x,y)+F \cdot f(x+1,y)+G \cdot f(x-1,y+1)+ \\ H \cdot f(x,y+1)+I \cdot f(x+1,y+1) \quad (2)$$

A special filter commonly used is a Laplacian filter. The Laplacian is the second-order derivative of a two-dimensional function f(x,y) given by equation 3:

$$\nabla^2 f = \frac{\partial^2 f}{\partial y^2} + \frac{\partial^2 f}{\partial x^2} \quad (3)$$

This Laplacian function can be implemented in discrete space using the 3×3 matrix described above with the coefficients as follows: E=4; B,D,F & H=−1 and the rest of the coefficients zero. Other coefficient combinations can also be used to compute variations of the discrete Laplacian as long as the coefficient E is positive and the rest are negative and that the sum of all coefficients is zero. The spatial frequency response of any 3×3 filter is determined by equation (4) below:

$$H(\omega_x, \omega_y) = \sum_{m=-1}^{1} \sum_{n=-1}^{1} h(m, n) \cdot e^{-jw_x m} e^{-jw_y n} \quad (4)$$

where:

H($\omega_x$, $\omega_y$) is the frequency response of the filter for frequencies $\omega_x$ and $\omega_y$; the function h(m, n) describes the coefficients of the matrix above; the coefficient E is the value of h(0,0), A is the value of h(−1,−1), etc; and j is the complex number $\sqrt{-1}$.

By analyzing the frequency response of the discrete 3×3 Laplacian filter using equation (4), it is evident that the discrete 3×3 Laplacian is a high pass filter. By modifying the coefficients, the particular response of the filter can be adjusted. Additionally, a 5×5 or larger filter can be used for even finer control over the response.

Raindrops and other moisture can be detected by using a 3×3 Laplacian filter described above. Every pixel is examined individually in a loop fashion and a variable used to store the total amount of "moisture" detected. The Laplacian for each pixel is computed using the formula for g(x,y) described above with the Laplacian coefficients.

A flow diagram in accordance with the present invention is illustrated in FIG. 5. Initially in step 46, an image of the windshield is acquired. As mentioned above, the optical system in accordance with the present invention images the scene in such a way that distant objects are out of focus and objects at the windshield distance are in focus. Thus, if there is no moisture or other matter on the windshield, only a blurry image of distant objects will be captured. A blurry image will have a relatively low high frequency spatial component. Thus, the value of the Laplacian in such a situation will be relatively low. If there is rain or other moisture on the windshield, the drops will be in focus and the image will contain relatively large high frequency components. Despite the blurring of distant objects by the optical system 30, oncoming headlamps from other vehicles which are relatively bright may contribute a significant high frequency spatial component. In order to filter this component out, pixels which have a gray scale value above the saturation level of the analog to digital converter (i.e., pixels with a gray scale value at or near 255) may be skipped.

In step 48, the Laplacian of each pixel is computed and the results are stored. More particularly, if the magnitude of a Laplacian is above a given threshold, indicating a large enough high frequency spatial component to indicate rain or other moisture, this value is summed with the values of the other pixels to indicate the total value of rain or other moisture which is compared against a threshold, which may be a user set threshold as indicated in step 50. If the sum of the Laplacian of each of the pixels is greater than the threshold as determined in step 52, windshield wipers are actuated in step 54. Otherwise, the system loops back to step 46 and acquires a new image of the windshield.

The threshold indicated in step 52 may be a fixed threshold or a variable threshold. In applications where variable threshold is used, the threshold may be a user set threshold implemented by a control knob or slide with a voltage output. This voltage output may then be sampled and converted to a digital value which is appropriately scaled for comparison with the sum of the pixels which indicates the total amount of rain.

In order to prevent spurious operation of the system, the operation of the wiper blade is sensed in step 56. In particular, a small sub window of the image array sensor may be selected to allow more cycles to be processed per second in order to detect a relatively rapidly moving windshield wiper. An image of the wiper is acquired in step 56. Each image is processed using two one-dimensional high pass filters; one for the vertical direction and one for the horizontal direction as indicated in step 58. Since the windshield wiper will appear as a vertical line in an image, there should be a significantly higher high frequency component in a horizontal direction than in a vertical direction. Thus, a vertical high pass filter may be implemented using a 3×3 matrix described above with the coefficient E set to 2, coefficients B and H set to −1 and the rest set to zero. A horizontal filter is implemented with the coefficient E set to 2, the coefficients D and F set to −1 and the rest set to zero. The sum of each component is tallied in the same fashion as used to compute the Laplacian discussed above. In step 60, the ratio of the horizontal component to the vertical component is computed. If the horizontal component is much greater than the vertical component, a vertical line is assumed to be present in the image indicating the presence of the windshield wipers.

If the wipers of the automobile are designed in such a way that the wipers are never approximately vertical when it crosses the rain sensing area, the filters described above can be modified to accommodate such a configuration. For example, various other edge detection methods well known in the art of image processing can also be used. Additionally, if the wiper speed for the vehicle windshield wipers is so fast that it blurs slightly in the image for the necessary exposure time, the horizontal filter can be modified to subtract the pixels two positions to the left and right of the current pixel instead of the pixels immediately next to the current pixel.

After the wiper has cleared the image sensing area, as indicated in step 62, another image of the windshield is acquired in step 64 for which the Laplacian is computed. This computation is used as a zero point measurement that may be subtracted from all subsequent measurements until the next wipe. In this way, long-term high frequency spatial components in the image of a dirty windshield, cracks, scratches and frozen ice will not contribute to the detected amount of rain.

If the windshield wiper is not detected within a given time frame, the system assumes that a malfunction has occurred, which can be caused as a result of the windshield wiper being frozen to the windshield. During such a condition, the operation of the moisture sensor in accordance with the present invention can be suspended for a period of time to allow the ice to thaw. If outside temperature information is available, freezing climate conditions can be taken into account to decide if the wipers are failing because of a mechanical malfunction or due to ice.

The system is also able to adapt to varying light levels. In particular, during selected cycles, the average gray scale value of the image may be computed. If this value is high, indicating an over exposure to light, the image sensor integration time in the following cycle may be reduced to lower the average brightness. Similarly, if the light level is low, the integration time may be increased. In relatively dark conditions, some image sensors may not be capable of collecting enough light in a reasonable time to adequately image moisture such as raindrops. In such a situation, an additional illuminator may be provided to briefly illuminate the area of interest from behind while the image is being taken. If the windshield of the vehicle is not highly absorbent to infrared radiation, a near infrared illuminator can be used as long as the wavelengths are within the detectable region of the image sensor. An infrared illuminator has the benefit of not being visible to the human eye and thus not distracting to the driver.

Fog Detector

Figure 3:
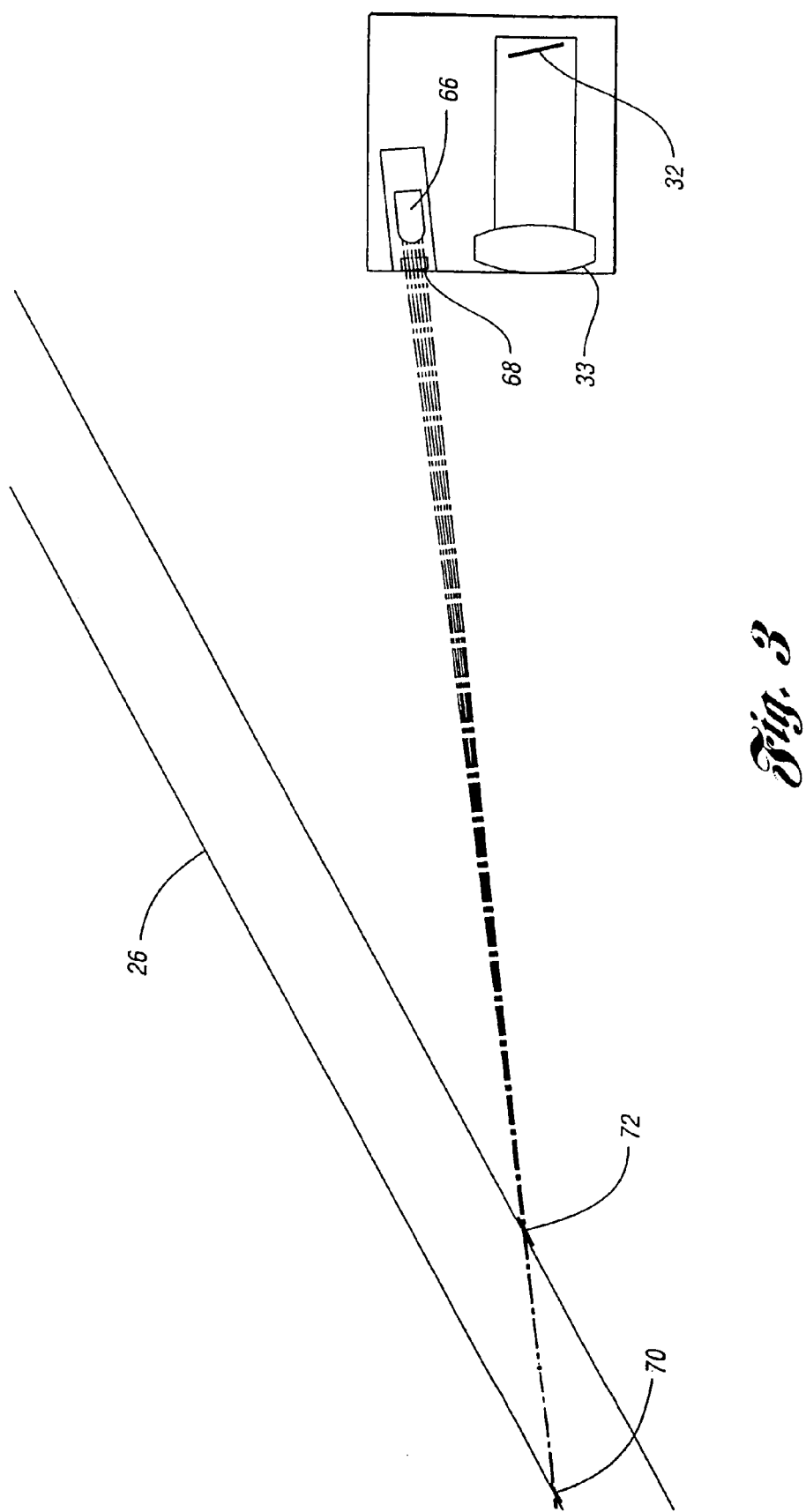
FIG. 3 is a physical diagram of a system in accordance with an alternate embodiment of the invention for sensing fog which illustrates the projection of a beam of light onto the windshield for fog detection.

In order to eliminate many of the operational deficiencies of known moisture sensing systems, the system in accordance with an alternate embodiment of the invention includes a system for detecting fog on the interior and the exterior of the windshield. As illustrated in FIGS. 2 and 3, a light emitting diode (LED) may be used for detecting fog both on the interior and the exterior of a vehicle windshield 26. Two different embodiments of the fog detection systems are disclosed both of which rely on the difference in the way the light from the LED 66 is reflected from the windshield 26 in the presence of fog. Fog detection may be done in alternate processing cycles with the rain detection. In particular, many cycles may be used for rain and moisture detection between fog detection cycles due to the slow onset of windshield fogging. At the beginning of the fog detection cycles, an image may be acquired using a window containing the expected location of the spots.

In the first embodiment, a light source that is either highly collimated or focused to a point at the windshield distance can be used. The light source can be either infrared emitting or visible emitting depending upon the absorption characteristics of the windshield. Infrared sources are preferable since they are not visible to the human eye and therefore do not pose a distraction. An infrared LED 66 may be used along with a lens 68 of a focal length equal to the windshield distance as generally shown in FIG. 2. The LED 66 may be positioned a few millimeters above the main optical assembly and angled so that the projected light as shown in FIG. 3 is aimed at the position of the main optical axis on the windshield 26. The LED 66 is initially turned off and an image is taken. Immediately following, the LED is turned on and a second image is taken. The difference between these images is used for spot detection. If no fog is present, the light will reflect from the windshield 26 at the Snell angle which will carry it well outside the field of view of the image sensor 32. If fog is present, the light will be reflected by Lambertian reflectance causing the fog to be imaged as a small spot 70 (FIG. 3). Due to the angles of the windshield 26 and the light source 66, outside fog will produce a spot 70 lower than a spot 72 produced by fog in the interior surface of the windshield 26. The location of these spots 70, 72 may be used to represent the presence of interior and/or exterior fog on the windshield 26. If fog is present on the interior of the windshield, exterior fog detection is not possible. However, this limitation is of no consequence because vision would be impaired anyway. The following truth table indicates the conclusions drawn from the presence of each spot:

| Exterior (Lower) Reflected Spot | Interior (Upper) Reflected Spot | Result |
| --- | --- | --- |
| Present | — | Exterior Fog |
| — | Present | Interior Fog |
| Not Present | Not Present | No Fog |

In an alternate embodiment an infrared or, if necessary, a visible LED is used. The LED must be either relatively small or be used in conjunction with a pin hole and aimed such that the light from the LED reflects off the windshield 26 and onto an image sensor at the Snell angle. In such a configuration, two reflections will occur: one off the inside of the windshield and one from the outer surface of the windshield by specular reflection. In this embodiment if fog is not present, the spots are reflected at the Snell angle and are visible by the image sensor. If there is fog on the exterior surface of the windshield 26, the spot from the interior reflection will be present, but the spot from the exterior refection will be a blur. The difference image is analyzed for interior fog. Initially a 3×3 Laplacian filter is used to create a new image which contains only the high frequency components of the original image. In this way, the blurred reflection from fog is illuminated. The spots are detected by taking the maximum value of a group of pixels in the expected region of each spot. A group slightly larger than the expected size of the spot may be used in order to correct for slight misalignments and for the fact that the Laplacian will only preserve the edges of the spots where the high frequency components are present. Also, slight fog may cause the spot to grow, but may not require action. For each spot, if the value is reasonably greater than zero, it is determined to be present. The following truth table indicates the detection of fog for the alternate embodiment:

| Exterior (Upper) Reflected Spot | Interior (Lower) Reflected Spot | Result |
| --- | --- | --- |
| Present | Present | No Fog |
| Not Present | Present | Exterior Fog |
| Not Present | Not Present | Interior Fog |

If the exterior fog is detected, the windshield wipers may be actuated to help remove the fog or, if desired, a warning light can be used to indicate this condition to the driver. Interior fog detection can be used to automatically actuate the vehicle defrost or defogger system preventing the driver from waiting until the significant fog has developed. More involved processing methods may include determining the size of the spot by computing the distance between the horizontal edges of the spot and thus having a measurement of the quantity of fog on the windshield which can be compared to a threshold.

Obviously, many modifications and variations of the present invention are possible in light of the above teachings. Thus, it is to be understood that, within the scope of the appended claims, the invention may be practiced otherwise than as specifically described above.

The invention claimed is:

1. A fog detection system for detecting fog on a vehicle windshield, said system comprising:
   an image sensor;
   an optical system operative to image at least a portion of the surface of the windshield onto the image sensor;
   an illumination device for illuminating an area within the at least one portion of the windshield surface, said optical system and illumination device configured to image reflections caused by fog on the inside and outside of the windshield in a different positions on said image sensor; and
   a processing system in communication with the image sensor and operative to analyze images from the image sensor to determine whether there is fog on the inside or outside of the windshield based upon the spatial position of the imaged reflections on said image sensor.

2. The fog detection system of claim 1, wherein said processing system activates the windshield defroster when fog is detected on the inside surface of the windshield.

3. The fog detection system of claim 1, wherein said processing system activates the windshield wipers when fog is detected on the outside surface of the windshield.

4. A fog detection system for detecting fog on a vehicle windshield, said system comprising:
   an image sensor;
   an optical system operative to image at least a portion of the surface of the windshield onto the image sensor;
   an illumination device for selectively illuminating an area within the at least one portion of the windshield surface; and
   a processing system in communication with the image sensor and said illumination device and operative to selectively activate and deactivate said illumination device and to analyze and compare images from the image sensor when said illumination device is activated and deactivated to detect fog on the windshield.

5. A windshield wiper control system for a vehicle comprising:
   an image sensor;
   an optical system operative to image at least a portion of the surface of the windshield onto the image sensor, said optical system is further operative to blur distant objects in the imaged scene while sharply focusing objects on the windshield; and
   a processing system in communication with the image sensor and operative to analyze images from the image sensor to detect moisture on the windshield and to activate the windshield wipers when moisture is detected.

6. The system of claim 5 and further including a rearview mirror assembly adapted for attaching to a vehicle, wherein said image sensor is supported by said rearview mirror assembly.

7. The system of claim 5 and further including a rearview mirror assembly adapted for attaching to a vehicle, wherein at least a portion of said processing system is supported by said rearview mirror assembly.

8. The system of claim 5 and further including an illuminator for providing supplemental illumination across substantially all of the imaged portion of the windshield surface.

9. The system of claim 5, wherein said processing system further operative to detect operation of a windshield wiper and to obtain a baseline image of the windshield immediately after it has been wiped by the windshield wiper, said processing system utilizing the baseline image to distinguish moisture from bugs, cracks, dirt, and other debris on the windshield.

10. The system of claim 5, wherein said image sensor is mounted in said vehicle such that said imaging surface is inclined with respect to vertical.

11. A windshield wiper control system for a vehicle comprising:
an image sensor;
an optical system operative to image at least a portion of the surface of the windshield onto the image sensor;
an illuminator for providing supplemental illumination across substantially all of the imaged portion of the windshield surface; and
a processing system in communication with the image sensor and the illuminator and operative to analyze images from the image sensor to detect moisture on the windshield and to activate the windshield wipers when moisture is detected.

12. The system of claim 11, wherein said illuminator emits infrared radiation.

13. The system of claim 12, wherein said processing system detects an ambient light level and activates said illuminator when the ambient light level falls below a threshold level.

14. The system of claim 11 and further including a rearview mirror assembly adapted for attaching to a vehicle, wherein said image sensor is supported by said rearview mirror assembly.

15. The system of claim 11 and further including a rearview mirror assembly adapted for attaching to a vehicle, wherein at least a portion of said processing system is supported by said rearview mirror assembly.

16. A windshield wiper control system for a vehicle comprising:
an image sensor;
an optical system operative to image at least a portion of the surface of the windshield onto the image sensor; and
a processing system in communication with the image sensor and operative to analyze images from the image sensor to detect moisture on the windshield and to activate the windshield wipers when moisture is detected, said processing system is further operative to detect operation of a windshield wiper and to obtain a baseline image of the windshield immediately after it has been wiped by the windshield wiper, said processing system utilizing the baseline image to distinguish moisture from bugs, cracks, dirt, and other debris on the windshield.

17. The system of claim 16, wherein, when moisture is detected and a windshield wiper is not detected, said processing system generates a control signal to suspend operation of the windshield wiper.

18. The system of claim 17, wherein said processing system generates the control signal to suspend operation of the windshield wiper if said processing system does not detect the presence of the wiper within a predetermined time period.

19. The system of claim 16, wherein said processing system detects the presence of the windshield wiper by determining if a plurality of high frequency components in the direction of wiper travel through the imaged portion of the surface is greater than a plurality of high frequency components in a direction normal to the direction of wiper travel through the imaged portion of the surface.

20. The system of claim 16, wherein said processing system compares images from said image sensor with those analyzed immediately following detection of the windshield wiper to determine whether the images are different.

21. The system of claim 20, wherein said processing system generates a control signal to deactivate the windshield wiper if said processing system determines that the compared images are not different.

22. The system of claim 16 and further comprising a user interface for allowing a user to adjust the sensitivity of said processing system to moisture when activating the windshield wipers.

23. The system of claim 16 and further including a rearview mirror assembly adapted for attaching to a vehicle, wherein said image sensor is supported by said rearview mirror assembly.

24. The system of claim 16 and further including a rearview mirror assembly adapted for attaching to a vehicle, wherein at least a portion of said processing system is supported by said rearview mirror assembly.

* * * * *